United States Patent
Yano et al.

(10) Patent No.: US 7,620,585 B2
(45) Date of Patent: Nov. 17, 2009

(54) ELECTRONIC CONTRACT SYSTEM

(75) Inventors: Yoshihiro Yano, Tokyo (JP); Fukio Handa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 715 days.

(21) Appl. No.: 10/459,377

(22) Filed: Jun. 11, 2003

(65) Prior Publication Data

US 2004/0111331 A1 Jun. 10, 2004

(30) Foreign Application Priority Data

Jun. 25, 2002 (JP) ............................. 2002-184072

(51) Int. Cl.
*G06Q 40/00* (2006.01)
(52) U.S. Cl. ............................. 705/37; 380/23; 380/25; 380/49; 395/226; 395/237
(58) Field of Classification Search ............... 705/1–79, 705/80
See application file for complete search history.

(56) References Cited

U.S. PATENT DOCUMENTS

| | | | |
|---|---|---|---|
| 6,587,837 B1 * | 7/2003 | Spagna et al. | 705/26 |
| 6,659,861 B1 * | 12/2003 | Faris et al. | 463/1 |
| 6,883,004 B2 * | 4/2005 | Bahl et al. | 707/10 |
| 6,898,577 B1 * | 5/2005 | Johnson | 705/51 |
| 7,203,662 B2 * | 4/2007 | Das et al. | 705/37 |
| 7,225,333 B2 * | 5/2007 | Peinado et al. | 713/164 |
| 2003/0135464 A1 * | 7/2003 | Mourad et al. | 705/50 |

* cited by examiner

*Primary Examiner*—Evens J Augustin
*Assistant Examiner*—Shahid Kamal
(74) *Attorney, Agent, or Firm*—Ladas and Parry LLP

(57) ABSTRACT

In order to give sufficient evidential admissibility to the content of a contract made online, contractual terms data C that shows a character string of contractual terms is prepared and stored by a processor on the side of a transacting party A. The data C is then transmitted to a processor on the side of a transacting party B, and is stored. A hash value ID2 of the contractual terms data C is calculated by the B-side processor, and a signature Sig2 of the party B is added and transmitted to the A-side processor as formal contractual proposal information. The signature Sig2 is verified by the A-side processor. A coincidence is verified between a hash value ID1 of the data C and the ID2 that has been transmitted. A signature Sig1 of the party A is added to a coinciding hash value ID, and is transmitted to the B-side processor as formal contractual acceptance information. The signature Sig1 is verified by the B-side processor, and a coincidence is verified between the hash value ID2 and the ID that has been transmitted.

9 Claims, 4 Drawing Sheets

ELECTRONIC CONTRACT SYSTEM

BACKGROUND OF THE INVENTION

The present invention relates to an electronic contract system and more particularly to an electronic contract system used to make a contract regarding predetermined contractual terms between a first transacting party and a second transacting party through a network.

With the spread of the Internet, the frequency of electronic commerce between business firms has steadily increased while raising its relative importance in business. Likewise, various types of electronic commerce, such as the purchase of commodities, reservations for tickets, subscriptions to electronic magazines, and participation in auctions, have begun to permeate personal daily lives. In not a few cases, these types of electronic commerce are carried out without being directly conscious of each other's existence, because they use the Internet. However, so long as the electronic commerce is one form of legal transaction, the electronic commerce must be based on making a trading contract between a first transacting party and a second transacting party. A declaration of mutual intentions to the effect that an agreement shall be approved with given contractual terms is required to make such a trading contract. Ordinarily, a procedure is adopted in which one of the transacting parties presents contractual terms, whereas the other transacting party consents to the contractual terms. For example, in purchasing a commodity or participating in an auction by use of a general electronic shopping mall established on the Internet, a part (commodity name, price, delivery method, settlement procedure, etc.) of the contractual terms is presented on Web pages of the electronic shopping mall. When a general consumer makes a declaration of intention to the effect that he/she orders specific commodities listed on Web pages for a specific number of goods, the contractual terms are fixed, and, when the electronic-mall party accepts this order, handling for the conclusion of the contract is performed on the assumption that both parties have agreed to the contractual terms. Normally, a confirmation E-mail stating that the order has been accepted is sent as a reply from the electronic-mall party.

An array of security problems are pointed out with respect to the electronic commerce, and a technical means to solve these problems is becoming commercially viable. For example, SSL (Secure Sockets Layer) technology or the like is generally used as a means for enhancing the security of information transmission through the Internet, and a digital signature technology is generally used as a means for certifying the contents of the transmission information and its sender.

As mentioned above, transactions using the Internet have already been performed in various forms, and each of the transactions is legally based on an online contract concluded by both transacting parties. However, the online contract concluded on the Internet is insufficient as admissable evidence and has more legal problems than a general contract concluded by allowing both parties to sign a document. Actually, in making an online contract to purchase commodities at an electronic shopping mall, most malls make practice of replying by an E-mail for order confirmation. The contents of the E-mail are expressed in various forms ranging from a form in which ordered items are repeated in detail to a form in which only the message of order confirmation is recorded. Some E-mails have a form in which the conclusion of a contact is never legally formalized. Additionally, there are cases in which differences concerning contractual terms arise between both parties, and there are not a few cases in which discrepancies arise as to commodity details, selling prices, order quantity, etc., ex post facto. Thus, if the legal evidential value of contractual terms is insufficient, sufficient countermeasures cannot be taken when a troublesome case arises in which commodities are not sent even after the settlement of payment or in which commodities different from ordered items have been sent.

SUMMARY OF THE INVENTION

It is therefore an object of the present invention to provide an electronic contract system capable of giving sufficient evidential admissibility to contractual terms that have been concluded.

(1) According to the first feature of the present invention, in an electronic contract system used to make a contract concerning predetermined contractual terms between a first transacting party and a second transacting party through a network, a first information processor used by the first transacting party and a second information processor used by the second transacting party are prepared.

The first information processor includes:

(a) a first contractual terms storing unit (110) for storing contractual terms data C showing a character string of the contractual terms;

(b) a first identification data generating unit (120) having an operational function based on a predetermined algorithm that obtains output data univocally fixed with respect to input data, so as to generate first contractual terms identifying data ID1 univocally fixed with respect to the contractual terms data C by performing an arithmetical operation based on the algorithm with respect to the contractual terms data C;

(c) a first identification data verifying unit (130) for verifying a coincidence between the first contractual terms identifying data ID1 and the second contractual terms identifying data ID2 that has been transmitted from the second information processor;

(d) a first transacting-party signature generating unit (140) for generating a digital signature Sig1 of the first transacting party with respect to contractual terms identifying data ID that has coincided through verification of the first identification data verifying unit;

(e) a first signature verifying unit (150) for verifying consistency between the second contractual terms identifying data ID2 and the digital signature Sig2 of the second transacting party in the formal contractual proposal information that has been transmitted from the second information processor;

(f) a contractual terms information transmitting unit (160) for transmitting contractual terms information including the contractual terms data C to the second information processor through the network; and (g) a formal contractual acceptance information transmitting unit (170) for transmitting formal contractual acceptance information including the coinciding contractual terms identifying data ID and the digital signature Sig1 of the first transacting party to the second information processor through the network.

The second information processor includes:

(a) a second contractual terms storing unit (210) for storing the contractual terms data C in the contractual terms information that has been transmitted;

(b) a second identification data generating unit (220) for generating second contractual terms identifying data ID2 univocally fixed with respect to the contractual terms data C stored in the second contractual terms storing unit by performing an arithmetical operation (the same operation performed in the first identification data generating unit) based on the algorithm with respect to the contractual terms data C stored in the second contractual terms storing unit;

(c) a second identification data verifying unit (230) for verifying a coincidence between the second contractual terms identifying data ID2 generated by the second identification data generating unit and the coinciding contractual terms identifying data ID that has been transmitted from the first information processor;

(d) a second transacting-party signature generating unit (240) for generating a digital signature Sig2 of the second transacting party with respect to the second contractual terms identifying data ID2;

(e) a second signature verifying unit (250) for verifying consistency between the coinciding contractual terms identifying data ID and the digital signature Sig1 of the first transacting party in the formal contractual acceptance information that has been transmitted from the first information processor; and (f) a formal contractual proposal information transmitting unit (260) for transmitting formal contractual proposal information including the second contractual terms identifying data ID2 and the digital signature Sig2 of the second transacting party to the first information processor through the network.

(2) The second feature of the present invention resides in the electronic contract system of the first feature, wherein the first identification data generating unit and the second identification data generating unit each have a function to generate contractual terms identifying data with respect to the contractual terms data C by use of a specific algorithm selected from among N kinds of algorithms (N is two or more), and the same algorithm is selected and used in the first identification data generating unit and the second identification data generating unit when an arithmetical operation is performed to generate contractual terms identifying data with respect to the same contractual terms data C.

(3) The third feature of the present invention resides in the electronic contract system of the second feature, wherein the second identification data generating unit has a function to select a specific algorithm from among the N kinds of algorithms, and the formal contractual proposal information transmitting unit has a function to transmit an algorithm specifying code showing a specific algorithm selected by the second identification data generating unit while being included in formal contractual proposal information, and the first identification data generating unit has a function to select the specific algorithm based on the algorithm specifying code that has been transmitted.

(4) The fourth feature of the present invention resides in the electronic contract system of the first to the third features, using an algorithm, which has one-wayness in which unique output data is fixed with respect to input data whereas unique input data is not fixed with respect to output data and in which a total data amount of output data is smaller than a total data amount of input data, as an algorithm to obtain contractual terms identifying data.

(5) The fifth feature of the present invention resides in the electronic contract system of the first to the fourth features, wherein the first identification data generating unit and the second identification data generating unit perform an arithmetical operation by which a hash value, which obtained by applying a hash function to the contractual terms data C, becomes contractual terms identifying data.

(6) The sixth feature of the present invention resides in the electronic contract system of the first to the fifth features, wherein the first information processor and the second information processor have a function to transmit and receive information exchanged through the network by encrypting the information according to a predetermined method.

(7) The seventh feature of the present invention resides in the electronic contract system of the sixth feature, wherein the first information processor has a function to encrypt information to be transmitted by use of a public key of the second transacting party and transmit the information, and the second information processor has a function to decrypt the information that has been received by use of a private key of the second transacting party and load the information.

(8) The eighth feature of the present invention resides in the electronic contract system of the sixth or the seventh feature, wherein the second information processor has a function to encrypt information to be transmitted by use of a public key of the first transacting party and transmit the information, and the first information processor has a function to decrypt the information that has been received by use of a private key of the first transacting party and load the information.

(9) The ninth feature of the present invention resides in the electronic contract system of the first to the eighth features, wherein the first transacting-party signature generating unit has a function to generate a digital signature by use of a private key of the first transacting party, and the second signature verifying unit verifies data consistency by use of a public key of the first transacting party.

(10) The tenth feature of the present invention resides in the electronic contract system of the first to the ninth features, wherein the second transacting-party signature generating unit has a function to generate a digital signature by use of a private key of the second transacting party, and the first signature verifying unit verifies data consistency by use of a public key of the second transacting party.

(11) The eleventh feature of the present invention resides in the electronic contract system of the first to the tenth features, wherein a plurality of pieces of contractual terms data are stored in the first contractual terms storing unit while being related to the first contractual terms identifying data ID1, and a plurality of pieces of contractual terms data are stored in the second contractual terms storing unit while being related to the second contractual terms identifying data ID2, so that specific contractual terms data can be retrieved according to the contractual terms identifying data.

(12) The twelfth feature of the present invention resides in to constitute an information processor which functions as the first information processor or the second information processor in the electronic contract system of the first to the eleventh features.

(13) The thirteenth feature of the present invention resides in to prepare a program to operate a computer as the information processor of the twelfth feature and to distribute the program by recording it in a computer-readable recording medium.

DETAILED DESCRIPTION OF THE PREFERRED EMBODIMENTS

Figure 1:
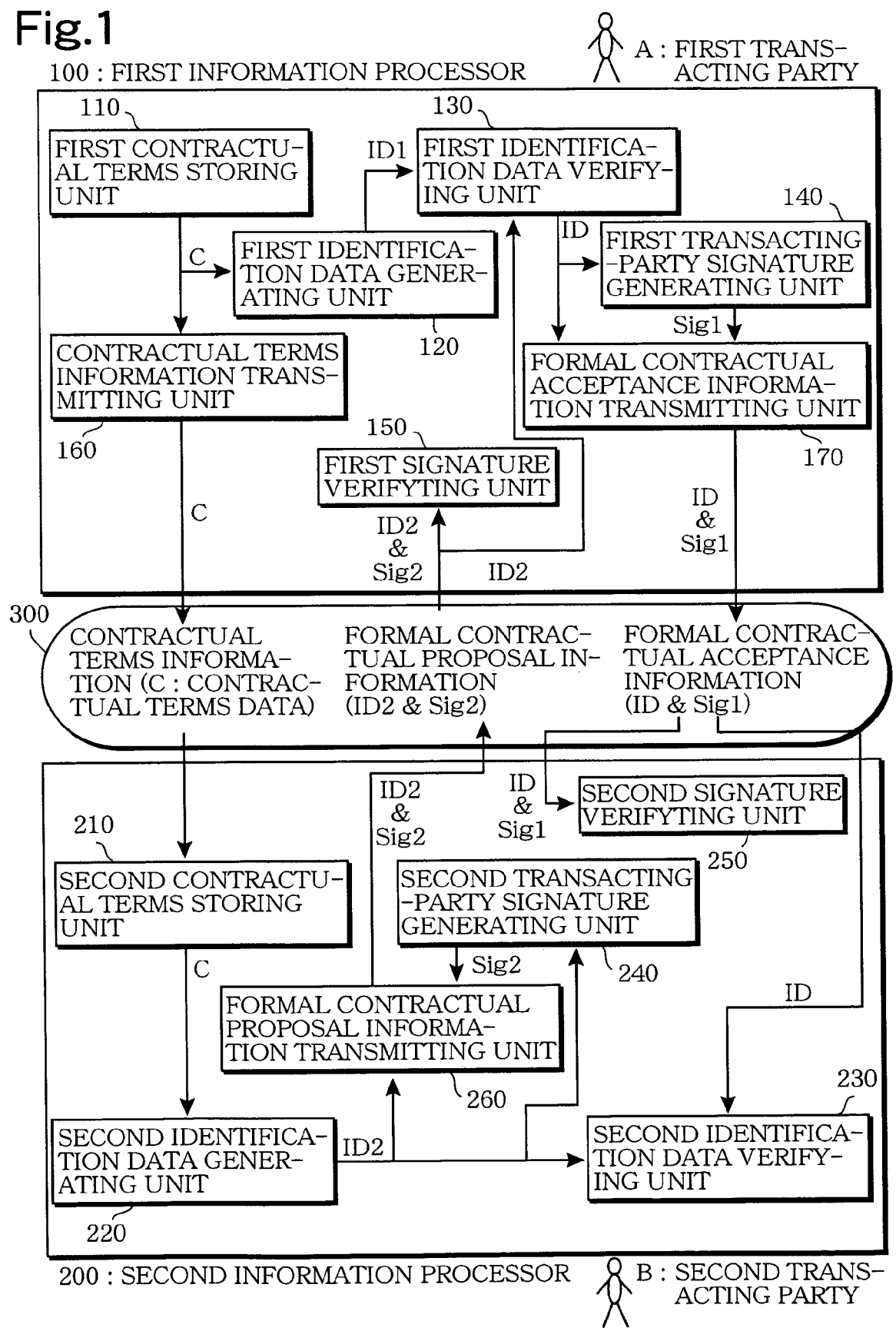
FIG. 1 is a block diagram that shows a structure of an electronic contract system according to a basic embodiment of the present invention.

The present invention will hereinafter be described on the basis of embodiments shown in the drawings.

<§1. Structure of an Electronic Contract System According to a Basic Embodiment of the Present Invention>

FIG. 1 is a block diagram that shows a structure of an electronic contract system according to a basic embodiment of the present invention. This system is an electronic contract system used to conclude a contract for predetermined contractual terms through a network between a first transacting party A and a second transacting party B, in which a first information processor 100 and a second information processor 200 are connected together through a network 300. The first information processor 100 and the second information processor 200 are each formed by a computer, and the network 300 is a network connecting the two computers. Any type of network can be used as the network 300 in carrying out the present invention. Herein, a description will be given of an example in which the network 300 of the Internet is used as a typical embodiment of the present invention, and the first information processor 100 and the second information processor 200 are each formed by a computer accessible to the Internet.

In the electronic contract system according to the present invention, a contract is made by carrying out an information exchange three times in total between the two processors, as shown in an oval drawing part indicating the network 300 of FIG. 1. In greater detail, first, contractual-terms information from party A to tentatively propose the contractual terms is transmitted from the first information processor 100 to the second information processor 200. Thereafter, formal contractual proposal information from party B is transmitted from the second information processor 200 to the first information processor 100. Lastly, formal contractual acceptance information from party A is transmitted from the first information processor 100 to the second information processor 200.

The first information processor 100 is a computer used by the first transacting party A, and, as shown in the figure, is made up of a first contractual terms storing unit 110, a first identification data generating unit 120, a first identification data verifying unit 130, a first transacting-party signature generating unit 140, a first signature verifying unit 150, a contractual terms information transmitting unit 160, and a formal contractual acceptance information transmitting unit 170. On the other hand, the second information processor 200 is a computer used by the second transacting party B, and, as shown in the figure, is made up of a second contractual terms storing unit 210, a second identification data generating unit 220, a second identification data verifying unit 230, a second transacting-party signature generating unit 240, a second signature verifying unit 250, and a formal contractual proposal information transmitting unit 260. Each of these units is shown as a block element to express a specific function executed by the computer, and, in practice, is formed by installing a specific-function executing program in the computer. The constituent elements called "first . . . unit" and "second . . . unit" among the units are functionally identical to each other both in the first information processor 100 and the second information processor 200. That is, the constituent elements belonging to the first information processor 100 are each called "first . . . unit," and the corresponding constituent elements belonging to the second information processor 200 are each called "second . . . unit" so as to be distinguished among them.

Next, the function of each constituent element will be described in detail. First, the first contractual terms storing unit 110 is a unit that has a function to store contractual terms data C showing a character string of the contractual terms. The contractual terms data C mentioned here is data that shows contractual terms to be temporarily proposed to the second transacting party B. For example, that is character-string data of a contractual content having the message "I order two sets of commodities XYZ. Please send them by C.O.D. (cash on delivery)." Such contractual terms data C is stored in the first contractual terms storing unit 110. Likewise, the second contractual terms storing unit 210 of the second information processor 200 is a constituent element having a function to store the contractual terms data C. As described later, the contractual terms data C transmitted from the first information processor 100 is stored in the second contractual terms storing unit 210.

The first identification data generating unit 120 is a unit that has an operational function based on a predetermined algorithm that can obtain output data univocally fixed with respect to input data. The contractual terms data C stored in the first contractual terms storing unit 110 is given to the first identification data generating unit 120 as input data. In the first identification data generating unit 120, an arithmetical operation is performed on the basis of a predetermined algorithm with respect to the given contractual terms data C, thus generating first contractual terms identifying data ID1 univocally fixed with respect to the contractual terms data C. In this embodiment, an algorithm which has one-wayness in which unique or sole output data is fixed with respect to input data, whereas unique or sole input data is not fixed with respect to output data and according to which the total data amount of the output data becomes smaller than the total data amount of the input data is used as the predetermined algorithm mentioned above.

In the aforementioned example, the contractual terms data C is character-string data that shows the contractual content "I order two sets of commodities XYZ. Please send them by C.O.D." When this character-string data is given to the first identification data generating unit 120 as input data, the first contractual terms identifying data ID1 of, for example, "123456" is obtained as output data. Herein, the first contractual terms identifying data ID1 becomes data univocally fixed as a calculation result based on the predetermined algorithm mentioned above with respect to the contractual terms data C. Accordingly, the sole data "123456" can be obtained from the character-string data "I order two sets of commodities XYZ. Please send them by C.O.D." However, the algorithm used in this embodiment has one-wayness in which only the data ID1 is fixed from the data C, whereas the sole data C is not fixed from the data ID1. In the aforementioned example, the original character-string data "I order two sets of commodities XYZ. Please send them by C.O.D." cannot be fixed from the data "123456." In a comparison of the total data amount, the data amount of the first contractual terms identifying data ID1 is smaller than the data amount of the contractual terms data C.

An algorithm using a hash value obtained by applying a hash function onto input data as output data can be mentioned as a concrete example of the algorithm which has one-wayness in which unique output data is fixed with respect to input data, whereas unique input data is not fixed with respect to output data and according to which the total data amount of the output data becomes smaller than the total data amount of the input data as described above. In practice, an algorithm using this hash function is employed in this embodiment. That is, in the first identification data generating unit 120, a predetermined hash function is applied onto given contractual terms data C (more accurately speaking, onto data obtained by converting the data C into numerical values), and an arithmetical operation is performed to obtain a hash value. The resulting hash value is output as the first contractual terms identifying data ID1.

On the other hand, the second identification data generating unit 220 on the side of the second information processor 200 has an operational function using the same algorithm as the algorithm in the first identification data generating unit 120. The contractual terms data C stored in the second contractual terms storing unit 210 is given to this second identification data generating unit 220 as input data, and second contractual terms identifying data ID2 is generated here. The first identification data generating unit 120 and the second identification data generating unit 220 have the same operational function based on the same algorithm as described above, and, when the same input data is given to the first and second units 120 and 220, the same output data can be obtained.

The first identification data verifying unit 130 is a constituent element that has a function to verify the coincidence between the first contractual terms identifying data ID1 generated by the first identification data generating unit 120 and the second contractual terms identifying data ID2 transmitted from the second information processor 200. Likewise, the second identification data verifying unit 230 is a constituent element that has a function to verify the coincidence between the second contractual terms identifying data ID2 generated by the second identification data generating unit 220 and the contractual terms identifying data ID transmitted from the first information processor 100. The contractual terms identifying data ID1, ID2, and ID are data that can serve to guarantee the content of the contractual terms data C, and are data univocally fixed from the contractual terms data C as described above. The first identification data verifying unit 130 and the second identification data verifying unit 230 have a function to verify whether the contractual terms identifying data transmitted from the opposite party is correct data formed on the basis of the specific contractual terms data C. For example, the first identification data verifying unit 130 has a function to verify whether the coincidence occurs between the first contractual terms identifying data ID1 given from the first identification data generating unit 120 and the second contractual terms identifying data ID2 transmitted from the side of the second information processor 200. If both the data ID1 and ID2 coincide with each other, the second contractual terms identifying data ID2 transmitted therefrom can be certainly recognized to be data formed on the basis of the specific contractual terms data C. Herein, when the first contractual terms identifying data ID1 and the second contractual terms identifying data ID2 coincide with each other, the coinciding data will be referred to as "coinciding contractual terms identifying data ID." In other words, if ID1 coincides with ID2 (ID1=ID2), the relationship ID=ID1=ID2 will be established.

The first transacting-party signature generating unit 140 has a function to generate a digital signature Sig1 of the first transacting party A with respect to the coinciding contractual terms identifying data ID according to the verification of the first identification data verifying unit 130. Likewise, the second transacting-party signature generating unit 240 has a function to generate a digital signature Sig2 of the second transacting party B with respect to the second contractual terms identifying data ID2. Generally, a digital signature is used so that a specific signer guarantees a specific content like a physical signature onto a sheet. When a digital signature Sig is attached to data D to be signed and is transmitted, the party that has received the data certifies that the signature attached to the data D is reliably the digital signature Sig, according to a predetermined method. Thereby, the party can ascertain the fact that the signer has transmitted the content of the data D. The digital signature Sig is generated by combining the data D to be signed with specific secret data Sec given to each signer and performing an arithmetical operation based on a predetermined algorithm. Therefore, if the signer is falsified to become a different party or person or if the content of the data D is manipulated, mismatching will occur between the data D and the digital signature Sig so that a correct authentication is not made.

For example, as an algorithm that generates a digital signature Sig like the aforementioned one, wide use is being made of an algorithm in which "a string of data that shows the secret data Sec of each signer is added to a string of data that shows the to-be-signed data D, they are then subjected to a hexadecimal numeric conversion, and a hash value obtained by applying a hash function onto the resulting numerical value is used as a digital signature Sig." A detailed description of this algorithm is omitted here. When this algorithm is used, the first transacting-party signature generating unit 140 adds the specific secret data Sec(A) given to the first transacting party A to the contractual terms identifying data ID which is data to be signed, and they are subjected to a hexadecimal numeric conversion, and an arithmetical operation is performed so as to use a hash value obtained by applying a hash function onto the resulting numerical value as a digital signature Sig1. Likewise, the second transacting-party signature generating unit 240 adds the specific secret data Sec(B) given to the second transacting party B to the second contractual terms identifying data ID2 which is data to be signed, and they are subjected to a hexadecimal numeric conversion, and an arithmetical operation is performed so as to use a hash value obtained by applying a hash function onto the resulting numerical value as a digital signature Sig2.

The first signature verifying unit 150 has a function to verify consistency between the second contractual terms identifying data ID2 and the digital signature Sig2 of the second transacting party in the formal contractual proposal information transmitted from the second information processor 200. Likewise, the second signature verifying unit 250 has a function to verify consistency between the contractual terms identifying data ID and the digital signature Sig1 of the first transacting party in the formal contractual acceptance information transmitted from the first information processor 100. The digital signatures are normally verified by an inquiry to a predetermined certification authority. That is, the specific secret data Sec(A) given to the party A and the specific secret data Sec(B) given to the party B are registered in the certification authority. The first signature verifying unit 150 and the second signature verifying unit 250 can ascertain the consistency of the combination of the data D and the digital signature Sig by an inquiry to the certification authority. For example, when the first signature verifying unit 150 inquires of the certification authority about the consistency between the second identifying data ID2 and the digital signature Sig2 of the second transacting party, the certification authority performs processing to generate a digital signature according to a predetermined algorithm by use of the data ID2 and the secret data Sec(B). If a generated digital signature coincides with the digital signature Sig2, the two signatures can be regarded as being consistent, and therefore a certification result to the effect that the signature is correct is notified from the certification authority to the first signature verifying unit 150.

The contractual terms information transmitting unit 160 has a function to transmit contractual terms information including the contractual terms data C stored in the first contractual terms storing unit 110 to the second information processor 200 through the network 300. More specifically, in the aforementioned example, the contractual terms data C of the character-string data "I order two sets of commodities XYZ. Please send them by C.O.D." and its accompanying data (e.g., address to which commodities are sent, telephone number) are transmitted as contractual terms information to the second information processor 200. The formal contractual proposal information transmitting unit 260 has a function to transmit formal contractual proposal information that includes the second contractual terms identifying data ID2 and the digital signature Sig2 of the second transacting party to the first information processor 100 through the network 300. The formal contractual acceptance information transmitting unit 170 has a function to transmit formal contractual acceptance information that includes the coinciding contractual terms identifying data ID and the digital signature Sig1 of the first transacting party to the second information processor 200 through the network 300.

A description has been given of the structure of the electronic contract system according to the basic embodiment of the present invention with reference to the block diagram of FIG. 1. As described above, in practice, the first and second information processors 100 and 200 are realized by the computer connected to the network 300, and each constituent element shown as a block in FIG. 1 is an element to be realized by a peculiar function of software using the hardware of the computer. Therefore, in practice, the electronic contract system according to the present invention is realized by installing a program that functions as each constituent element shown in FIG. 1 in a general-purpose computer that has a function to connect to the network 300. Such a program can be distributed online or can be distributed in the state of being recorded on a computer-readable recording medium.

<§2. Contractual Procedure Using the Electronic Contract System According to the Basic Embodiment of the Present Invention>

Next, a description will be given of a contractual procedure that uses the electronic contract system according to the basic embodiment shown in FIG. 1. The electronic contract system according to the present invention can be used not only to allow a general consumer to execute commodity purchases, ticket reservations, electronic-magazine subscriptions, participation in auctions, etc., on the Internet but also to conduct electronic commerce between business firms through various networks. However, in this example, the following description will be given of a case in which a commodity purchase contract is concluded by use of the electronic contract system according to the present invention when the party A (i.e., first transacting party), who is a general consumer, purchases a specific commodity from the party B (i.e., second transacting party), who is a mail-order house managing an electronic shopping mall, through the Internet 300, for convenience of explanation. In this example, the first information processor 100 can be formed by a personal computer, a cellular telephone, a portable information terminal, etc., used by the party A, and the second information processor 200 can be formed by a Web server managed by the party B.

Figure 2:
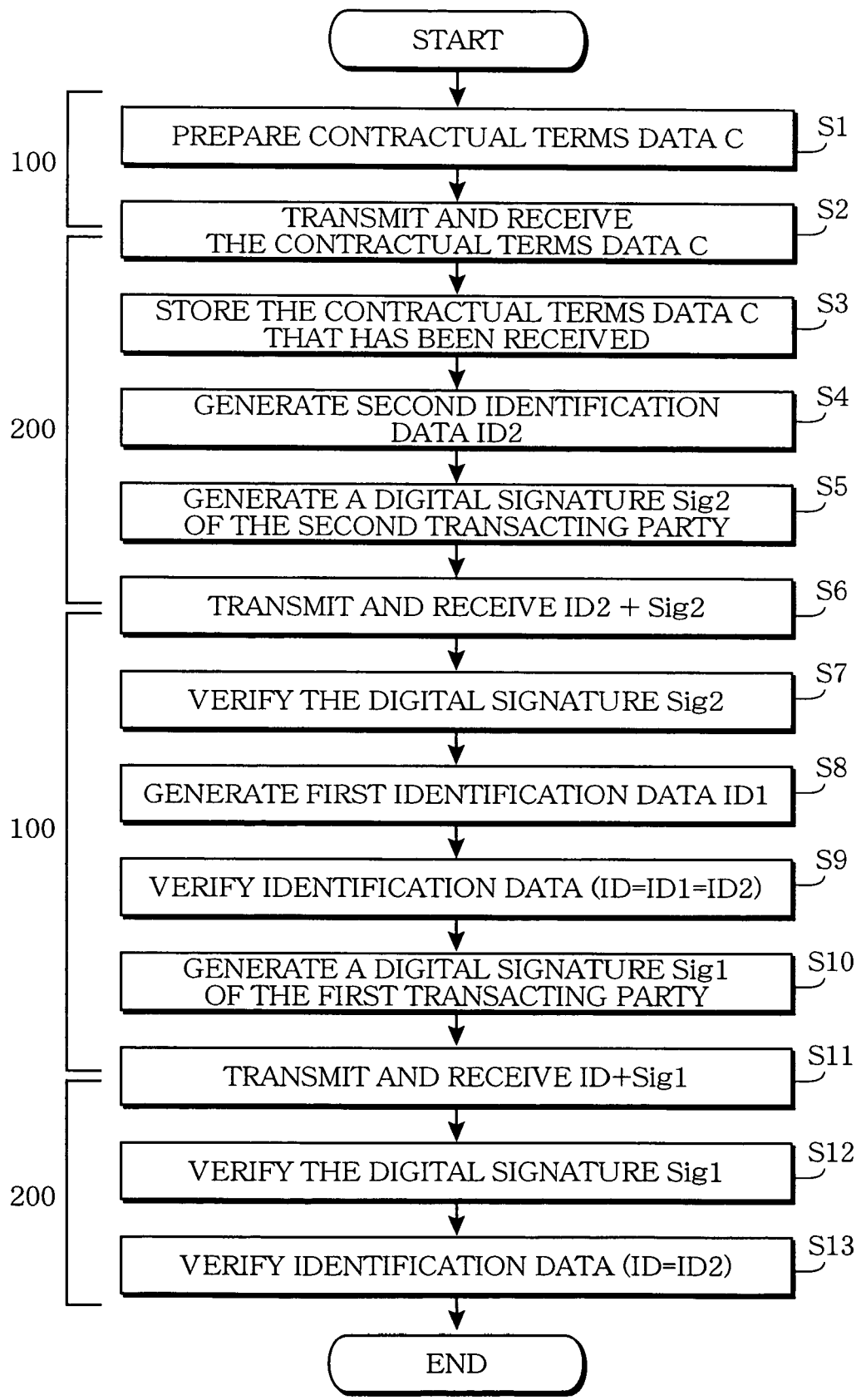
FIG. 2 is a flowchart that shows a contractual procedure using the electronic contract system of FIG. 1.

FIG. 2 is a flowchart that shows a contractual procedure that uses the electronic contract system according to the present invention. Among the steps S1 to S13 shown in this flowchart, the steps marked "100" at the left are processes performed on the side of the first information processor 100, and the steps marked "200" at the left are processes performed by the second information processor 200. First, in step S1, the first transacting party A prepares the contractual terms data C. In greater detail, the contractual terms data C formed by a character string showing the contractual content "I order two sets of commodities XYZ. Please send them by C.O.D." is prepared on the side of the first information processor 100, and is stored in the first contractual terms storing unit 110. This contractual terms data C does not necessarily need to be formed on the side of the party A. It is permissible to transmit data prepared on the side of the party B to the side of the party A, or to make the contractual terms data C by combining data that has been input from a keyboard by the party A with a model prepared on the side of the party B. Let it be assumed that the party A accesses the Web page provided by the party B through the Internet 300, then selects specific commodities and a paying method from a commodity catalog listed on the Web page, and orders them. In this case, when the party A selects the commodities and the paying method, the modeled character-string data "I order N sets of commodities XYZ. Please send them by C.O.D." is transmitted from the Web server of the party B to the party A. The party A can form the contractual terms data C "I order two sets of commodities XYZ. Please send them by C.O.D." by inputting "two," which is the amount of the order, for this model. In brief, in step S1, no limitations are imposed on the method according to which the contractual terms data C is prepared, as long as the contractual terms data C with which a contract is made is prepared in the state of being stored in the first contractual terms storing unit 110.

Thereafter, the contractual terms data C prepared in the first contractual terms storing unit 110 is transmitted and received in step S2. That is, the contractual terms data C in the first contractual terms storing unit 110 is transmitted to the second information processor 200 by the contractual terms information transmitting unit 160 as contractual terms information through the network 300. The second information processor 200 extracts the contractual terms data C from the contractual terms information that has been received, and stores the contractual terms data C in the second contractual terms storing unit 210 in step S3. At this moment, the same contractual terms data C is stored in the first and second contractual terms storing units 110 and 210, and a contract is temporarily proposed from party A to party B. However, since a signature of party A has not yet been attached to the contractual terms data C transmitted to party B at this moment, the content of the contractual terms data C stored in the second contractual terms storing unit 210 at this moment is not treated as a formal declaration of intention of party A. The content of the contractual terms data C is purely a temporary proposal at this moment.

Thereafter, party B determines whether to make a declaration of intention to formally conclude a contract concerning the content of the contractual terms data C stored in the second contractual terms storing unit 210. For this determination, it is possible to have a function capable of allowing party B to read the content of the contractual terms data C stored in the second contractual terms storing unit 210 while displaying the data C on a display screen, if necessary. However, this determination does not necessarily need to be made by party B in every case. If the contractual content is within a predetermined amount of money, a program may be created so that a declaration of intention to formally conclude a contract can be automatically made. In any case, the processes of step S4 and of the steps subsequent to step S4 are carried out if party B has the declaration of intention to formally conclude a contract. Conversely speaking, the process for contractual conclusion is stopped here if party B does not have the declaration of intention to formally conclude a contract. Herein, a description is omitted of a processing procedure performed when the process for contractual conclusion is stopped and of constituent elements used for such processing. Preferably, in practical use, processing is performed so that a notification stating that party B has refused the contractual conclusion can be transmitted to party A.

If party B determines to make a formal contract, the second contractual terms identifying data ID2 is generated in step S4. That is, the contractual terms data C stored in the second contractual terms storing unit 210 is given to the second identification data generating unit 220, and the second contractual terms identifying data ID2 is generated according to a predetermined algorithm. In this embodiment, the second contractual terms identifying data ID2 is calculated as a hash value obtained by applying a predetermined hash function to the contractual terms data C.

Thereafter, a digital signature Sig2 of the second transacting party is generated in step S5. That is, the digital signature Sig2 of party B concerning the second contractual terms identifying data ID2 is generated by the second transacting-party signature generating unit 240. As described above, the digital signature Sig2 is generated by use of secret data Sec (B) unique to party B, and is data to prove that party B has signed the data ID2 to be signed.

Thereafter, in step S6, data in which the digital signature Sig2 of the second transacting party has been added to the second contractual terms identifying data ID2 is transmitted as formal contractual proposal information from the formal contractual proposal information transmitting unit 260, and is received at the side of the first information processor 100. That is, a transmission is made with the signature Sig2 fixed to the data ID2. This shows that a proposal of a formal contract concerning the contractual terms data C has been offered from party B to party A.

This formal contractual proposal information is received on the side of the first information processor 100, and then the digital signature Sig2 is verified in step S7. That is, by the first signature verifying unit 150, the consistency is verified between the digital signature Sig2 of the second transacting party and the second contractual terms identifying data ID2 included in the formal contractual proposal information. This verification is conducted by, for example, an inquiry to a certification authority as mentioned above. If a correct verification result is obtained here, it can be confirmed that the second contractual terms identifying data ID2 has been reliably transmitted from the party B in question, and, accordingly, the process proceeds to step S8 and the steps subsequent to step S8. If a correct verification result cannot be obtained through verification of the first signature verifying unit 150, the process for contractual conclusion is stopped here, because the formal contractual proposal information that has been transmitted can be regarded as not having been transmitted from party B or as having been falsified, which is not shown in the flowchart of FIG. 2.

If a correct verification result is obtained through verification of the first signature verifying unit 150, it can be confirmed at least that the second contractual terms identifying data ID2 has been reliably transmitted from the party B in question. Therefore, after that, a verification is conducted as to whether the second contractual terms identifying data ID2 is data corresponding to the contractual terms data C tentatively proposed by party A. First contractual terms identifying data ID1 is first generated in step S8. That is, the contractual terms data C stored in the first contractual terms storing unit 110 is given to the first identification data generating unit 120, and the first contractual terms identifying data ID1 is generated by an arithmetical operation according to a predetermined algorithm. Thereafter, a coincidence is verified between the first contractual terms identifying data ID1 and the second contractual terms identifying data ID2 in step S9. That is, the first identification data verifying unit 130 verifies whether a coincidence occurs between the first contractual terms identifying data ID1 generated by the first identification data generating unit 120 and the second contractual terms identifying data ID2 transmitted from the side of the second information processor 200. As described above, the first identification data generating unit 120 and the second identification data generating unit 220 have the function to generate the first contractual terms identifying data ID1 and the second contractual terms identifying data ID2, respectively, while performing the arithmetical operation according to exactly the same algorithm. Therefore, a coincidence will occur between the first contractual terms identifying data ID1 and the second contractual terms identifying data ID2 if the contractual terms data C stored in the first contractual terms storing unit 110 is identical to the contractual terms data C stored in the second contractual terms storing unit 210. Herein, data that has obtained the coincidence by verification of the first identification data verifying unit 130 is referred to as "coinciding contractual terms identifying data ID" (i.e., ID1=ID2=ID). A disagreement between the data ID1 and the data ID2 indicates that the contractual terms data C in the first contractual terms storing unit 110 differs from the contractual terms data C in the second contractual terms storing unit 210 and that the contractual content recognized by party A differs from the contractual content recognized by party B. Therefore, in this situation, the process for contractual conclusion is stopped here.

If a correct verification result is obtained by verification of the first identification data verifying unit 130, a digital signature Sig1 of the first transacting party is generated in step S10. That is, the digital signature Sig1 of party A concerning the "coinciding contractual terms identifying data ID" is generated by the first transacting-party signature generating unit 140. As described above, the digital signature Sig1 is data that is generated by use of the secret data Sec(A) unique to party A and that is used to prove that party A has signed the to-be-signed data ID.

Thereafter, data in which the digital signature Sig1 of the first transacting party has been added to the "coinciding contractual terms identifying data ID" is transmitted as formal contractual acceptance information from the formal contractual acceptance information transmitting unit 170, and is received at the side of the second information processor 200 in step S11. That is, a transmission is made with the signature Sig1 fixed to the data ID. This shows that the acceptance of a formal contract concerning the contractual terms data C has been made from party A to party B.

This formal contractual acceptance information is received at the side of the second information processor 200, and then the digital signature Sig1 is verified in step S12. That is, the second signature verifying unit 250 verifies the consistency between the digital signature Sig1 of the first transacting party and the "coinciding contractual terms identifying data ID" included in the formal contractual acceptance information. This verification is conducted by, for example, an inquiry to a certification authority as mentioned above. If a correct verification result is obtained here, it can be confirmed that the "coinciding contractual terms identifying data ID"

has been reliably transmitted from the party A in question, and, accordingly, the process proceeds to step S13. If a correct verification result cannot be obtained by verification of the second signature verifying unit 250, the process for contractual conclusion is stopped here, because the formal contractual acceptance information that has been transmitted can be regarded as not having been transmitted from the party A in question or as having been falsified, which is not shown in the flowchart of FIG. 2.

If a correct verification result is obtained by verification of the second signature verifying unit 250, it can be confirmed at least that the "coinciding contractual terms identifying data ID" has been reliably transmitted from the party A in question. Therefore, after that, a verification is conducted as to whether the "coinciding contractual terms identifying data ID" is data corresponding to the contractual terms data C stored in the second contractual terms storing unit 210. That is, a coincidence is verified between the second contractual terms identifying data ID2 generated by the second identification data generating unit 220 and the "coinciding contractual terms identifying data ID" transmitted from the side of the first information processor 100 in step S13. If the verification result obtained by the first identification data verifying unit 130 shows the coincidence, the relationship ID1=ID2=ID is inevitably established, and, normally, the verification result obtained by the second identification data verifying unit 230 will also show the coincidence. If disagreement therebetween is caused here, it can be judged that there is the possibility of some falsity, and the process for contractual conclusion is stopped here. If a correct verification result is obtained by verification of the second identification data verifying unit 230, a formal contract concerning the content of the contractual terms data C can be regarded as having been accepted by party A.

The procedure shown in the flowchart of FIG. 2 is, of course, an example of the contractual procedure using the electronic contract system according to the present invention, and the present invention is not limited to this contractual procedure. For example, in the example of FIG. 2, the generation process (step S4) of the second contractual terms identifying data ID2 is performed prior to the generation process (step S8) of the first contractual terms identifying data ID1. However, this order may be reversed, and both of the processes may be performed concurrently.

Figure 3:
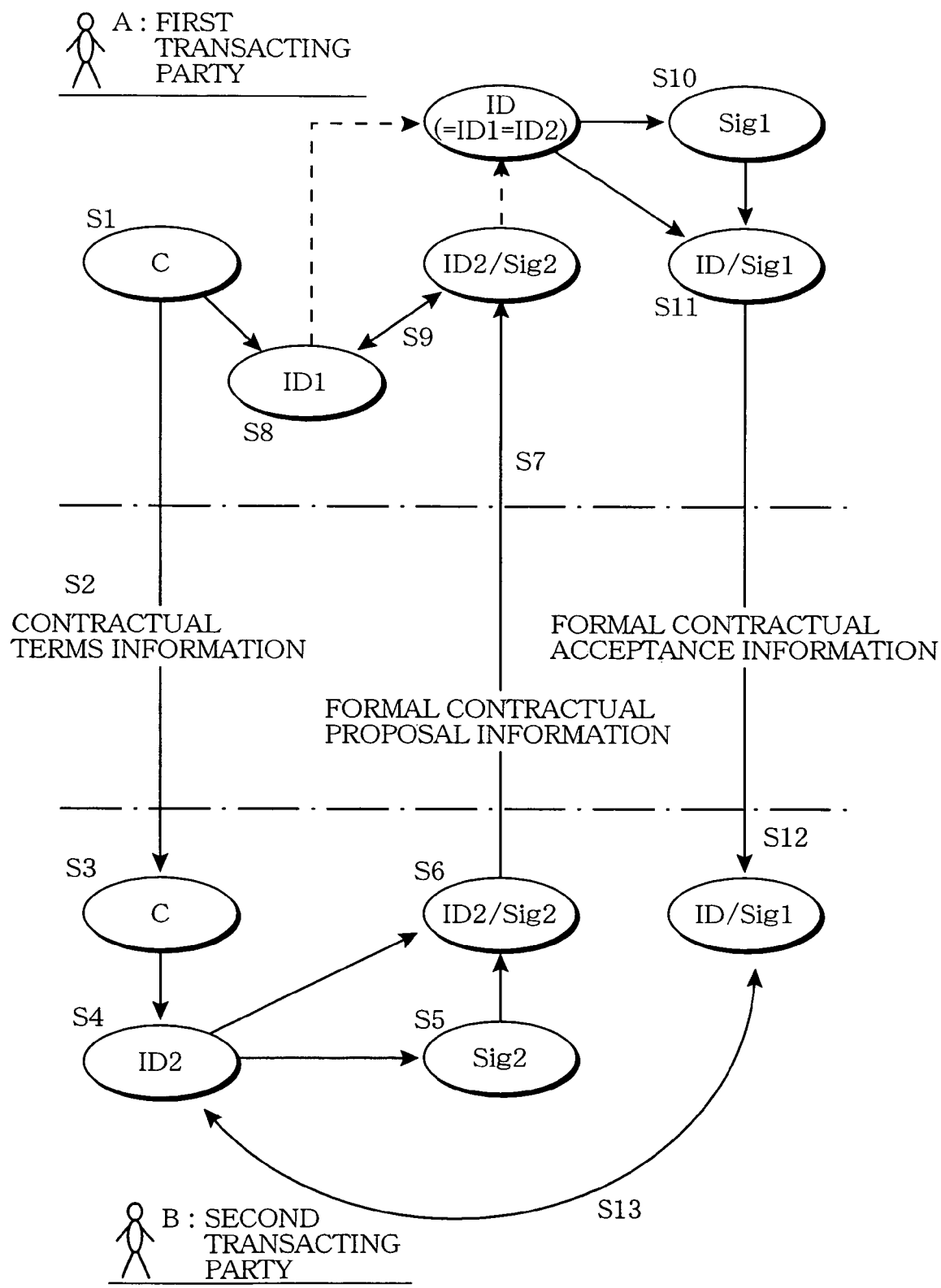
FIG. 3 is a diagram that shows a data flow in the contractual procedure shown in the flowchart of FIG. 2.

FIG. 3 is a diagram that shows a data flow in the contractual procedure shown in the flowchart of FIG. 2. In this figure, the upper part partitioned by the alternate long and short dashed line shows data handled on the side of the first information processor 100 used by the first transacting party A, the middle part shows data that flows through the network 300, and the lower part shows data handled on the side of the second information processor 200 used by the second transacting party B. Each oval block shows the data, and the arrow shows the flow of the data. The symbols S1 to S13 designate steps in the flowchart of FIG. 2.

The contractual terms data C to be contracted is first prepared on the side of party A (step S1), is then transmitted to the side of party B as contractual terms information (step S2), and is stored on the side of party B (step S3). On the side of party B, second contractual terms identifying data ID2 is generated on the basis of the contractual terms data C (step S4), the digital signature Sig2 of party B is then generated concerning the second contractual terms identifying data ID2 (step S5), and the digital signature Sig2 is added to the data ID2 (step S6) and is transmitted to party A as formal contractual proposal information. On the side of party A, the digital signature Sig2 is verified (step S7), first contractual terms identifying data ID1 is then generated on the basis of the contractual terms data C (step S8), and a verification is conducted as to the coincidence between the first contractual terms identifying data ID1 and the second contractual terms identifying data ID2 (step S9). Thereafter, the digital signature Sig1 of party A is generated concerning the "coinciding contractual terms identifying data ID" (step S10), and the digital signature Sig1 is added to the data ID (step S11), and is transmitted to party B as formal contractual acceptance information. On the side of party B, the digital signature Sig1 is verified (step S12), and then a verification is conducted as to the coincidence between the "coinciding contractual terms identifying data ID" and the second contractual terms identifying data ID2 (step S13).

A contract between the parties A and B is made through these steps. Sufficient evidential admissibility can be provided as to the content of the contract made therebetween by concluding the contract according to this procedure. In greater detail, when viewed from the side of party A, the second contractual terms identifying data ID2 to which the signature Sig2 of party B has been added is obtained as formal contractual proposal information presented from the side of party B, and therefore, by verifying the signature Sig2, it can be confirmed that the identification data ID2 has been reliably transmitted from the party B in question. Additionally, if a coincidence occurs between the identification data ID2 and the identification data ID1, it can be confirmed that the content of the contract (i.e., the contractual terms data C stored in the first contractual terms storing unit 110) recognized by party A is identical to the content of the contract (i.e., the contractual terms data C stored in the second contractual terms storing unit 210) recognized by party B. In the end, when viewed from the side of party A, it can be confirmed that a proposal of a formal contract has been made from the party B in question, who is a counterparty, concerning the content of the contract which is identical to the content of the contract recognized by party A, and, as a result, data that attests to this truth, if necessary, is obtained.

On the other hand, when viewed from the side of party B, the "coinciding contractual terms identifying data ID" to which the signature Sig1 of party A has been added is obtained as formal contractual acceptance information presented from the side of party A, and therefore, by verifying the signature Sig1, it can be confirmed that the identification data ID has been reliably transmitted from the party A in question. Additionally, if a coincidence occurs between the identification data ID and the identification data ID2, it can be confirmed that the content of the contract (i.e., the contractual terms data C stored in the second contractual terms storing unit 210) recognized by party B is identical to the content of the contract (i.e., the contractual terms data C stored in the first contractual terms storing unit 110) recognized by party A. In the end, when viewed from the side of party B, it can be confirmed that a formal contract has been accepted by the party A in question, who is a counterparty, concerning the content of the contract which is identical to the content of the contract recognized by party B, and, as a result, data that attests to this truth, if necessary, is obtained.

Thus, in the electronic contract system according to the present invention, the transmitting act of the contractual terms information from party A to party B has only the meaning of being a tentative proposal of the contents of the contract in the end, but the transmitting act of the formal contractual proposal information from party B to party A is the act of proposing a formal contract from party B concerning the specific contractual terms expressed by the contractual terms data C, and, furthermore, the transmitting act of the formal contractual acceptance information from party A to party B is the act of accepting a formal contract from party A concerning the specific contractual terms expressed by the contractual terms data C. A noteworthy aspect thereof is the fact that the contractual terms information to be transmitted as a tentative proposal includes the contractual terms data C, whereas the formal contractual proposal information or the formal contractual acceptance information does not include the contractual terms data C but includes the contractual terms identifying data instead of the data C. Since the contractual terms identifying data is data that is univocally obtained from the contractual terms data C, the identifying data fulfills the same function as the contractual terms data C in verification. Two great advantages are obtained by transmitting the contractual terms identifying data instead of transmitting the contractual terms data C. One of the advantages lies in enhancing security. When the Internet is used as the network 300, it is impossible to avoid the possibility that security problem will occur to data which is transmitted and received. However, security can be enhanced by transmitting and receiving the contractual terms identifying data instead of transmitting and receiving the contractual terms data C many times. The second advantage lies in the fact that the amount of data to be transmitted and received can be reduced. In the aforementioned embodiment, a hash value obtained by applying a hash function is used as the contractual terms identifying data, and the amount of the contractual terms identifying data can be more greatly reduced than the amount of the original contractual terms data C. Therefore, the communications amount can be greatly reduced by allowing the formal contractual proposal information or the formal contractual acceptance information to include not the contractual terms data C but the contractual terms identifying data which is the hash value.

<§3. Modification of the Electronic Contract System According to the Present Invention>

The electronic contract system according to the present invention has been described on the basis of the basic embodiment as above. Herein, a description will be given of some aspects of a modification of the present invention.

(1) Retrieval of the Contractual Terms Data C

In the aforementioned basic embodiment, an example has been described in which a contract is concluded on the basis of the specific contractual terms data C between the parties A and B. In practice, there are not a few cases in which a plurality of different contracts are concluded between the two parties. Additionally, the electronic contract system according to the present invention will be used not only for contractual conclusion between the parties A and B but also for contractual conclusion between two voluntary parties in a group of many transacting parties in practice. For example, if party B is an establisher of an electronic shopping mall, the counterparty will multiple general customers A(1), A(2), A(3), . . . , and contracts will be made concerning a plurality of contractual contents, such as a plurality of pieces of contractual terms data C(1), C(2), C(3), . . . (in this case, the customer A(1) performs a procedure for contractual conclusion by use of a first one 100(1) of the first information processors, the customer A(2) performs a procedure for contractual conclusion by use of a second one 100(2) of the first information processors, and the customer A(3) performs a procedure for contractual conclusion by use of a third one 100(3) of the first information processors.)

Usually, processing procedures for contractual conclusion concerning a plurality of contracts are sequentially performed in this manner, and a plurality of different contractual terms data C are sequentially stored in the first contractual terms storing units 110 and in the second contractual terms storing unit 210 when the electronic contract system according to the present invention is used. Preferably, in this case, each contractual terms data C is stored while being related to contractual terms identifying data so that retrieval can be performed according to the contractual terms identifying data. In other words, a plurality of pieces of contractual terms data are stored in the first contractual terms storing unit 110 while being related to the first contractual terms identifying data ID1, and a plurality of pieces of contractual terms data are stored in the second contractual terms storing unit 210 while being related to the second contractual terms identifying data ID2, thus making it possible to retrieve specific contractual terms data according to each contractual terms identifying data. In greater detail, concerning specific contractual terms data C(1) prepared in the first contractual terms storing unit 110, information that defines a corresponding relationship with the first contractual terms identifying data ID1(1) is added to the contractual terms data C(1) stored in the first contractual terms storing unit 110 when the first contractual terms identifying data ID1(1) is generated by the first identification data generating unit 120, so that the data C(1) can be retrieved by using the data ID1(1) as a key. Likewise, concerning specific contractual terms data C(1) stored in the second contractual terms storing unit 210, information that defines a corresponding relationship with the second contractual terms identifying data ID2(1) is added to the contractual terms data C(1) stored in the second contractual terms storing unit 210 when the second contractual terms identifying data ID2(1) is generated by the second identification data generating unit 220, so that the data C(1) can be retrieved by using the data ID2(1) as a key. This makes it possible to retrieve the i-th contractual terms data C(i) ("-th" is a suffix used to form ordinal numbers) according to contractual terms identifying data ID1(i) or ID2(i) even if a plurality of different contractual terms data C(1), C(2), C(3), . . . are stored in the first contractual terms storing unit 110 or in the second contractual terms storing unit 210. Therefore, corresponding contractual terms data C(i) can be easily retrieved when formal contractual proposal information or formal contractual acceptance information is transmitted from the counterparty.

(2) Use of a Plurality of Algorithms to Generate Contractual Terms Identifying Data In the basic embodiment shown in FIG. 1, a predetermined algorithm is prepared in the first identification data generating unit 120 or in the second identification data generating unit 220, and the first contractual terms identifying data ID1 or the second contractual terms identifying data ID2 is generated through an arithmetical operation using this algorithm. Although the algorithm to generate the contractual terms identifying data does not necessarily need to be concealed, it is preferable to prevent the algorithm from becoming a knowledge of a third party for security countermeasures. Additionally, in order to further enhance security, it is preferable to prepare plural kinds of algorithms and select any one of the algorithms each time.

Figure 4:
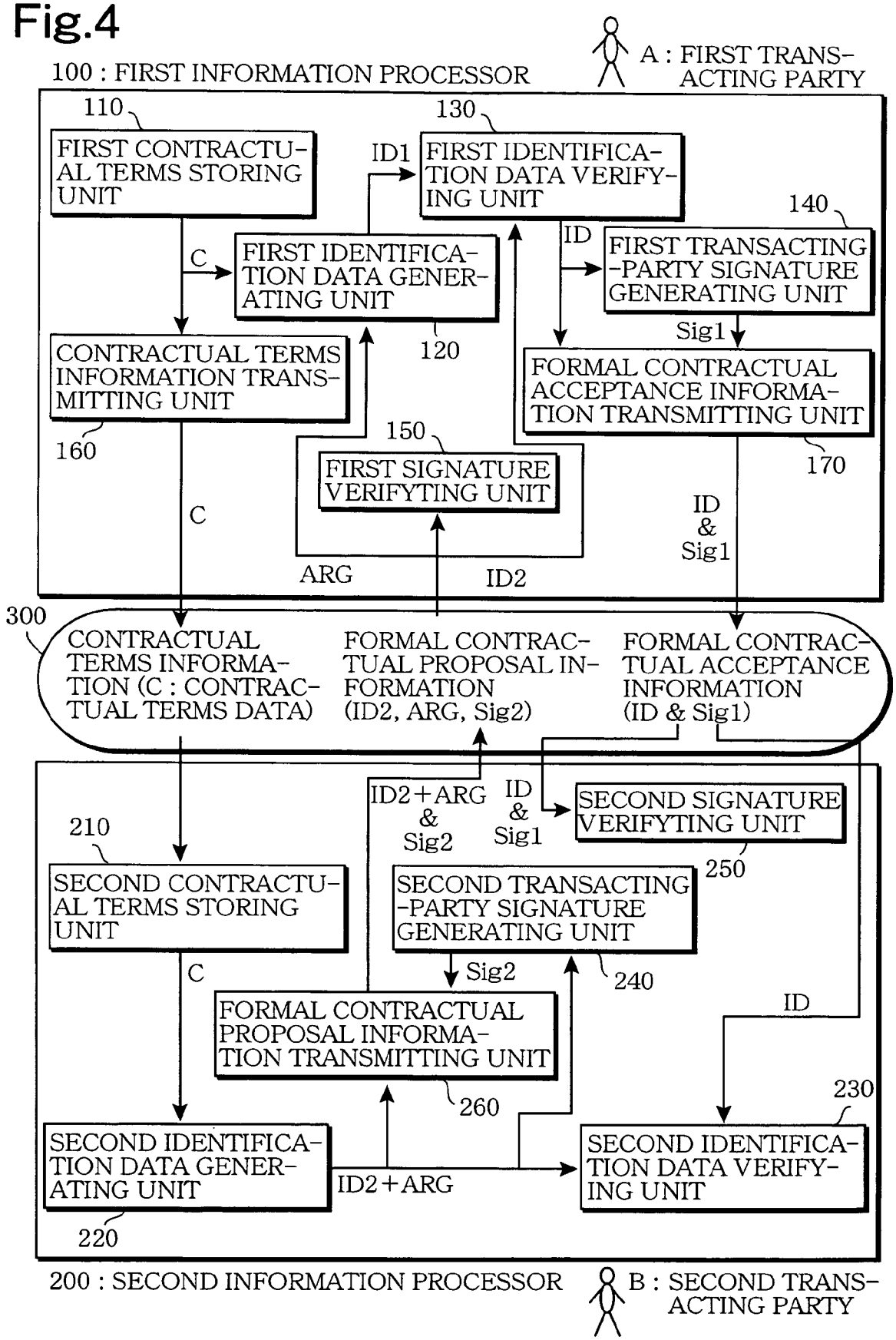
FIG. 4 is a block diagram that shows a modification of the basic embodiment of FIG. 1.

An embodiment shown in FIG. 4 is a modification of the basic embodiment shown in FIG. 1, which has a function to use a specific algorithm selected from among plural algorithms when contractual terms identifying data is generated. In greater detail, in the embodiment shown in FIG. 4, N kinds of algorithms are prepared in the first identification data generating unit 120 and in the second identification data generating unit 220, respectively (N is two or more), and contractual terms identifying data corresponding to the contractual terms data C can be generated by using a specific algorithm (which may be one algorithm or may be a combination of the algorithms) which is selected from among the algorithms. However, the electronic contract system according to the present invention has the following need: An arithmetical operation using the same algorithm is performed in the first identification data generating unit 120 and in the second identification data generating unit 220 concerning the same contractual terms data C, and the first contractual terms identifying data ID1 obtained by the arithmetical operation becomes identical to the second contractual terms identifying data ID2. Therefore, if an arithmetical operation is performed using the i-th algorithm selected from among the N kinds of algorithms on the side of the first identification data generating unit 120, there is a need to likewise perform an arithmetical operation using the i-th algorithm selected therefrom on the side of the second identification data generating unit 220.

Therefore, in the embodiment shown in FIG. 4, a specific algorithm is first selected at random from among the N kinds of algorithms on the side of the second identification data generating unit 220 of the second information processor 200, and second contractual terms identifying data ID2 is generated using the specific algorithm selected therefrom. Thereafter, an algorithm specifying code (e.g., a character string that indicates the name of a selected algorithm) ARG that indicates the specific algorithm selected therefrom is transmitted to the side of the first information processor 100. Specifically, the algorithm specifying code ARG is transmitted from the side of the second information processor 200 to the side of the first information processor 100 while being included in the formal contractual proposal information. That is, in the electronic contract system shown in FIG. 4, the second identification data generating unit 220 selects a specific algorithm at random from among the N kinds of algorithms when the contractual terms data C is given, and the second unit 220 performs the process of generating the second contractual terms identifying data ID2 using the algorithm selected therefrom. Thereafter, the algorithm specifying code ARG that indicates the selected specific algorithm is output together with the data ID2. Furthermore, in this embodiment, the entire data "ID2+ARG" in which the code ARG has been added to the end of the data ID2 is given to the second transacting-party signature generating unit 240 so that a digital signature Sig2 concerning the entire data "ID2+ARG" can be generated. Thus, the data ID2, the algorithm specifying code ARG, and the digital signature Sig2 concerning these pieces of information are transmitted as formal contractual proposal information from the formal contractual proposal information transmitting unit 260. In the first information processor 100, the formal contractual proposal information is received, and the first signature verifying unit 150 first verifies that the digital signature Sig2 is correct. Thereafter, the algorithm specifying code ARG included in the formal contractual proposal information is given to the first identification data generating unit 120, and the algorithm selected from among the N kinds of algorithms is specified. The first identification data generating unit 120 performs an arithmetical operation for the contractual terms data C stored in the first contractual terms storing unit 110 while using the algorithm specified by the algorithm specifying code ARG, and generates the first contractual terms identifying data ID1. Thereafter, the first identification data verifying unit 130 verifies the coincidence between the first contractual terms identifying data ID1 and the second contractual terms identifying data ID2. This is performed in exactly the same manner as in the aforementioned basic embodiment.

In the end, the contract-concluding processing procedure using the system according to the embodiment of FIG. 4 is almost identical to the procedure shown in the flowchart of FIG. 2. However, in generating the second contractual terms identifying data ID2 in step S4, a specific algorithm is selected at random from among the N kinds of algorithms, and the second contractual terms identifying data ID2 is generated using the algorithm selected therefrom. Further, in generating the digital signature Sig2 in step S5, the signature is generated concerning the entire data in which the algorithm specifying code ARG has been added to the data ID2, and, in step S6, the ID2, the ARG, and the Sig2 are transmitted and received as formal contractual proposal information. Furthermore, in forming the first contractual terms identifying data ID1 in step S8, an arithmetical operation is performed using the algorithm specified by the algorithm specifying code ARG.

It is also possible, of course, to perform the process of selecting the specific algorithm from among the N kinds of algorithms on the side of the first identification data generating unit 120. In this case, there is a need to transmit the algorithm specifying code ARG that indicates which one of the algorithms has been selected from the side of the first information processor 100 to the side of the second information processor 200 in the opposite manner to that of the aforementioned embodiment. Specifically, the algorithm specifying code ARG may be included in, for example, contractual terms information transmitted from the contractual terms information transmitting unit 160.

Additionally, in the aforementioned embodiment, an algorithm name that represents the selected algorithm is used as the algorithm specifying code ARG. However, any kind of code can be used as the algorithm specifying code ARG as long as it is a code that can specify the selected algorithm. In practice, a hash value obtained by applying a hash function to the algorithm name representing the selected algorithm can be conveniently used as the algorithm specifying code ARG, because the selected algorithm can be specified by less data capacity. In this case, the hash value of the contractual terms data C is used as the second contractual terms identifying data ID2, and the hash value of the name of the selected algorithm is used as the algorithm specifying code ARG. Therefore, the formal contractual proposal information includes data, which consists of "the hash value of the contractual terms data C"+"the hash value of the algorithm name," and the digital signature Sig2 concerning this data.

(3) Encryption of Transmitted and Received Data

As described above, in order to make a contract using the electronic contract system according to the present invention, there is a need to transmit contractual terms information from party A to party B, then transmit formal contractual proposal information from party B to party A, and transmit formal contractual acceptance information from party A to party B. Herein, since the formal contractual proposal information or the formal contractual acceptance information does not include the contractual terms data C that shows its original contractual terms, the advantage of enhancing security can be obtained as mentioned above. However, in order to achieve higher security, it is preferable to transmit and receive information exchanged through the network 300 between the first information processor 100 and the second information processor 200 in a state where the information is encrypted according to a predetermined method. For example, SSL (Secure Sockets Layer) technology can be used as the encrypted transmission technology.

It is also possible to employ encryption that uses a public key cryptosystem such as RSA encryption. In greater detail, when information is transmitted from the first information processor 100 to the second information processor 200, the information can be encrypted using the public key of the second transacting party B and can be transmitted on the side of the first information processor 100, whereas, on the side of the second information processor 200, the information that has been received can be decrypted using the private key of the second transacting party B and can be loaded. In contrast, when information is transmitted from the second information processor 200 to the first information processor 100, the information can be encrypted using the public key of the first transacting party A and can be transmitted on the side of the second information processor 200, whereas, on the side of the first information processor 100, the information that has been received can be decrypted using the private key of the first transacting party A and can be loaded.

(4) Formation of a Digital Signature Using the Public Key Cryptosystem

The aforementioned public key cryptosystem can be used also for the formation of a digital signature. That is, if the first transacting-party signature generating unit 140 performs the process of forming a digital signature using the private key of the first transacting party A, the second signature verifying unit 250 can verify the consistency of the data using the public key of the first transacting party A. Likewise, if the second transacting-party signature generating unit 240 performs the process of forming a digital signature using the private key of the second transacting party B, the first signature verifying unit 150 can verify the consistency of the data using the public key of the second transacting party B. Therefore, the first signature verifying unit 150 and the second signature verifying unit 250 can verify the signature without an inquiry to a certification authority if a reliable public key of a counterparty is maintained.

(5) Other Embodiments

Based on the embodiments, the present invention has been described as above. However, the present invention can be applied in various forms without being limited to these embodiments. For example, as described above, the contractual terms information consists of the contractual terms data C, and the formal contractual proposal information consists of the data ID2 and the signature Sig2, and the formal contractual acceptance information consists of the data ID and the signature Sig1 in the aforementioned basic embodiment. However, in practice, various accompanying information other than the aforementioned information may be included. For example, in the basic embodiment, the information ID+Sig1 (Sig1 is the signature of party A concerning the data ID) is used as the formal contractual acceptance information. Instead, the information ID+Sig2+Sig1 may be used as the formal contractual acceptance information. Herein, Sig2 is the signature of party B included in the formal contractual proposal information, and Sig1 is the signature of party A concerning the entire data "ID+Sig2." In the present application, "the digital signature with respect to some data" is used to include "a digital signature concerning the whole of new data obtained by adding another piece of data to said some data," as in the aforementioned embodiments.

Additionally, as an example, the first transacting party A is a general customer, and the second transacting party B is an establisher of an electronic shopping mall in the aforementioned embodiment. However, the electronic contract system according to the present invention can be used not only to make a contract for such a merchandise purchase but also to make contracts for ticket reservations, participation in an auction or in a name-your-price auction, etc., on the Internet.

The system can, of course, be used to make a contract for various dealings between business firms.

As described above, according to the present invention, it is possible to realize an electronic contract system capable of giving sufficient evidential admissibility to the contents of a contract that has been concluded.

What is claimed is:

1. An electronic contract system configured for making a contract concerning predetermined contractual terms between a first transacting party and a second transacting party through a network, the electronic contract system comprising a first information processor used by the first transacting party and a second information processor used by the second transacting party, comprising:

the first information processor including:
a first contractual terms storing unit programmed to store contractual terms data C including a character string of the contractual terms;
a first identification data generating unit having an operational function based on a predetermined algorithm that obtains output data univocally fixed with respect to input data, so as to generate first contractual terms identifying data ID1 univocally fixed with respect to the contractual terms data C by performing an arithmetical operation based on the algorithm with respect to the contractual terms data C; and
a contractual terms information transmitting unit programmed to transmit contractual terms information including the contractual terms data C to the second information processor through the network;
the second information processor including:
a second contractual terms storing unit programmed to store the contractual terms data C in the contractual terms information that has been transmitted;
a second identification data generating unit programmed to generate second contractual terms identifying data ID2 univocally fixed with respect to the contractual terms data C stored in the second contractual terms storing unit by performing an arithmetical operation based on the algorithm with respect to the contractual terms data C stored in the second contractual terms storing unit;
a second transacting-party signature generating unit programmed to generate a digital signature Sig2 of the second transacting party with respect to the second contractual terms identifying data ID2; and
a formal contractual proposal information transmitting unit programmed to transmit formal contractual proposal information including the second contractual terms identifying data ID2 and the digital signature Sig2 of the second transacting party to the first information processor through the network;
wherein the first information processor further includes:
a first signature verifying unit programmed to verify consistency between the second contractual terms identifying data ID2 and the digital signature Sig2 of the second transacting party in the formal contractual proposal information that has been transmitted;
a first identification data verifying unit programmed to verify a coincidence between the first contractual terms identifying data ID1 and the second contractual terms identifying data ID2;
a first transacting-party signature generating unit programmed to generate a digital signature Sig1 of the first transacting party with respect to contractual terms identifying data ID that has coincided through verification of the first identification data verifying unit; and a formal contractual acceptance information transmitting unit programmed to transmit formal contractual acceptance information including the coinciding contractual terms identifying data ID and the digital signature Sig1 of the first transacting party to the second information processor through the network, the formal contractual acceptance information indicating that the first transacting party is agreeing to the coinciding contractual terms identifying data ID; and the second information processor further includes:

a second signature verifying unit programmed to verify consistency between the coinciding contractual terms identifying data ID and the digital signature Sig1 of the first transacting party in the formal contractual acceptance information that has been transmitted; and a second identification data verifying unit programmed to verify a coincidence between the second contractual terms identifying data ID2 generated by the second identification data generating unit and the coinciding contractual terms identifying data ID, wherein the first identification data generating unit and the second identification data generating unit each have a function to generate contractual terms identifying data with respect to the contractual terms data C by use of a specific algorithm selected from among N kinds of algorithms (N is two or more), and the same algorithm is selected and used in the first identification data generating unit and the second identification data generating unit when an arithmetical operation is performed to generate contractual terms identifying data with respect to the same contractual terms data C, and wherein the second identification data generating unit has a function to select a specific algorithm from among the N kinds of algorithms, and the formal contractual proposal information transmitting unit has a function to transmit an algorithm specifying code including a specific algorithm selected by the second identification data generating unit while being included in formal contractual proposal information, and the first identification data generating unit has a function to select the specific algorithm based on the algorithm specifying code that has been transmitted.

2. The electronic contract system according to claim 1 using an algorithm, which has one-wayness in which unique output data is fixed with respect to input data whereas unique input data is not fixed with respect to output data and in which a total data amount of output data is smaller than a total data amount of input data, as an algorithm to obtain contractual terms identifying data.

3. The electronic contract system according to claim 1, wherein the first identification data generating unit and the second identification data generating unit perform an arithmetical operation by which a hash value, which obtained by applying a hash function to the contractual terms data C, becomes contractual terms identifying data.

4. The electronic contract system according to claim 1, wherein the first information processor and the second information processor have a function to transmit and receive information exchanged through the network by encrypting the information according to a predetermined method.

5. The electronic contract system according to claim 4, wherein the first information processor has a function to encrypt information to be transmitted by use of a public key of the second transacting party and transmit the information, and the second information processor has a function to decrypt the information that has been received by use of a private key of the second transacting party and load the information.

6. The electronic contract system according to claim 4, wherein the second information processor has a function to encrypt information to be transmitted by use of a public key of the first transacting party and transmit the information, and the first information processor has a function to decrypt the information that has been received by use of a private key of the first transacting party and load the information.

7. The electronic contract system according to claim 1, wherein the first transacting-party signature generating unit has a function to generate a digital signature by use of a private key of the first transacting party, and the second signature verifying unit verifies data consistency by use of a public key of the first transacting party.

8. The electronic contract system according to claim 1, wherein the second transacting-party signature generating unit has a function to generate a digital signature by use of a private key of the second transacting party, and the first signature verifying unit verifies data consistency by use of a public key of the second transacting party.

9. The electronic contract system according to claim 1, wherein a plurality of pieces of contractual terms data are stored in the first contractual terms storing unit while being related to the first contractual terms identifying data ID 1, and a plurality of pieces of contractual terms data are stored in the second contractual terms storing unit while being related to the second contractual terms identifying data ID2, so that specific contractual terms data can be retrieved according to the contractual terms identifying data.

* * * * *

UNITED STATES PATENT AND TRADEMARK OFFICE
CERTIFICATE OF CORRECTION

PATENT NO. : 7,620,585 B2
APPLICATION NO. : 10/459377
DATED : November 17, 2009
INVENTOR(S) : Yano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1125 days.

Signed and Sealed this

Twenty-sixth Day of October, 2010

David J. Kappos
*Director of the United States Patent and Trademark Office*